3,027,757
REVERSE BENDING FATIGUE TESTING DEVICE
Meyer R. Achter, 126 North Carolina Ave. SE., Washington 3, D.C., and George J. Danek, Jr., Suitland, Md. (4419 Ferndale Place SE., Washington 21, D.C.)
Filed June 3, 1959, Ser. No. 817,957
1 Claim. (Cl. 73—67.4)
(Granted under Title 35, U.S. Code (1952), sec. 266)

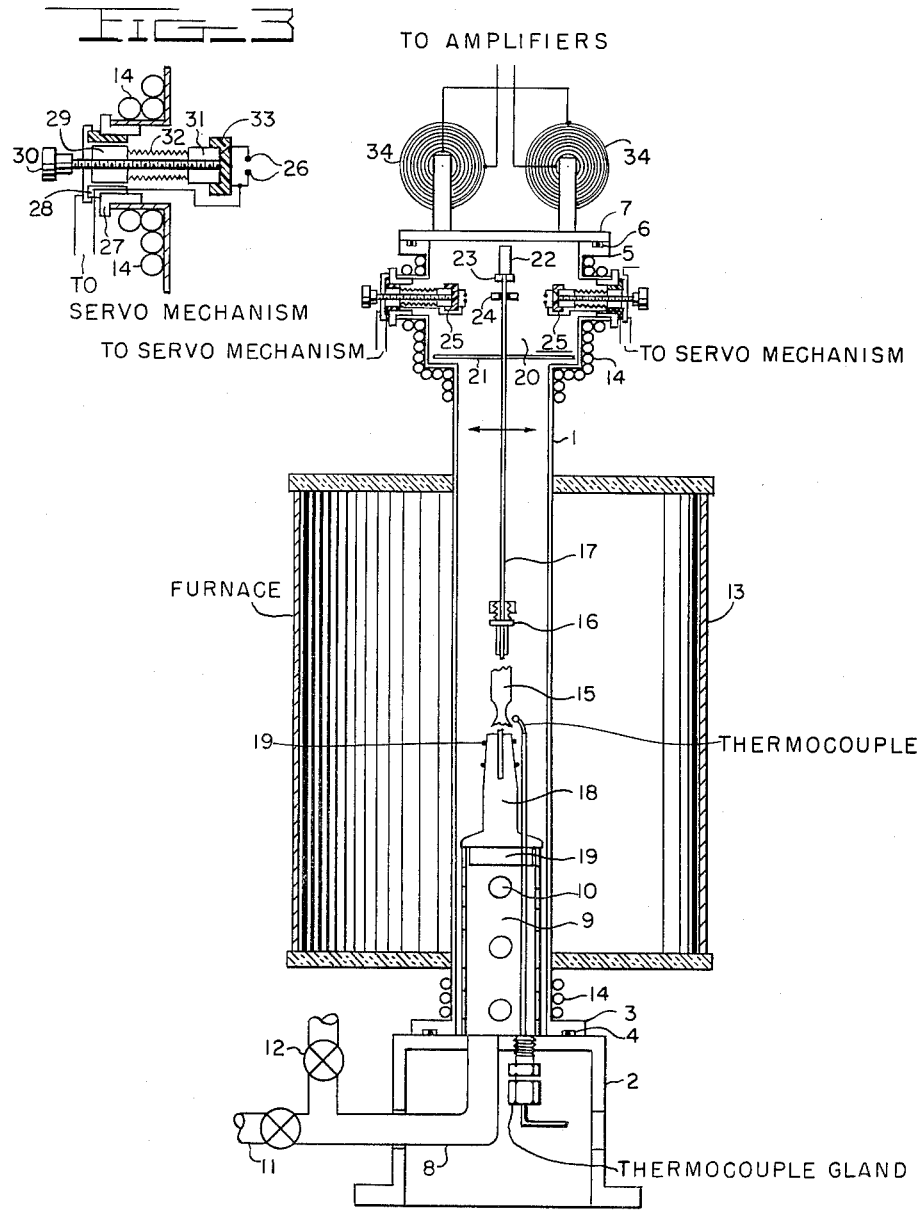

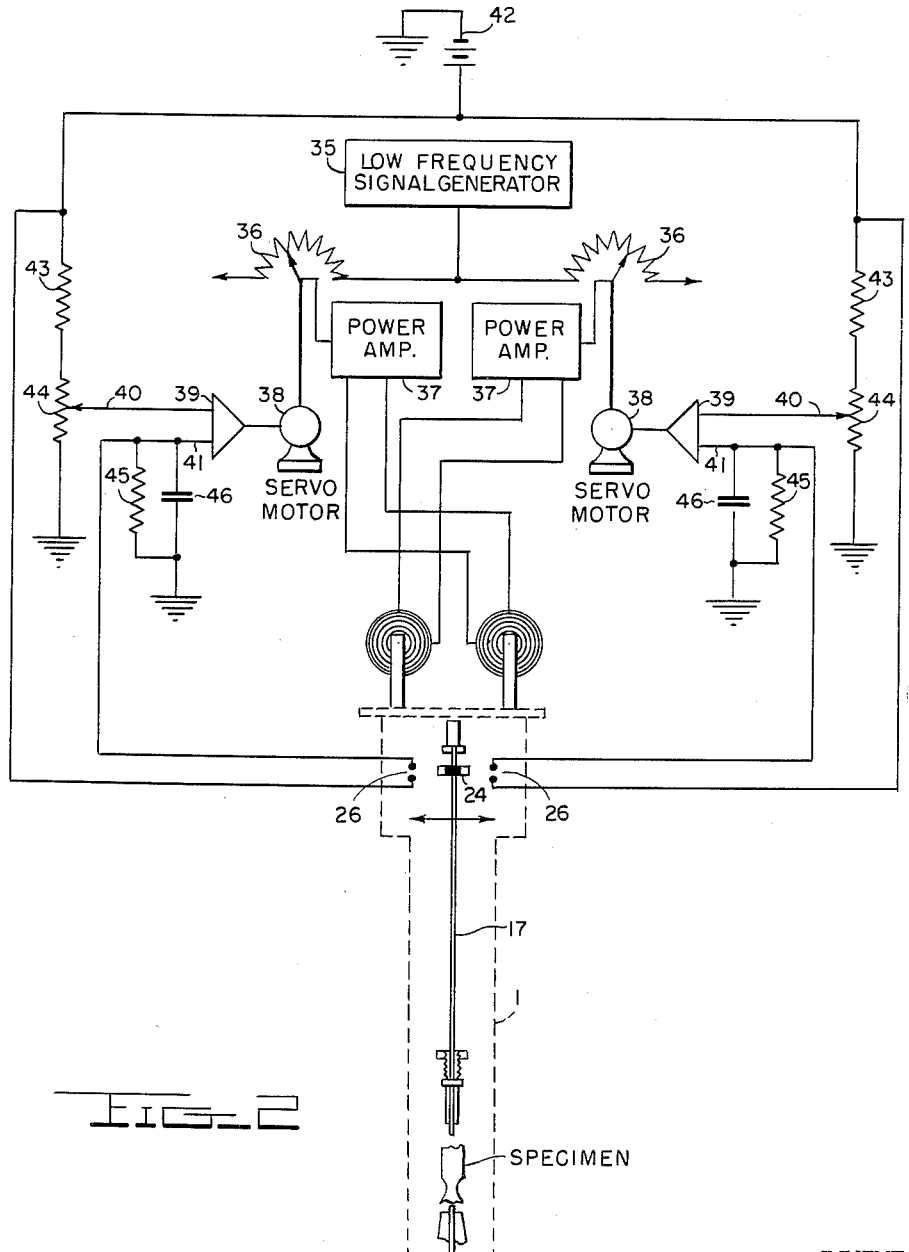

The invention described herein may be manufactured and used by or for the Government of the United States of America for governmental purposes without the payment of any royalties thereon or therefor.

This invention relates to an improved fatigue testing device for the performance of reverse-bending fatigue tests on materials at elevated temperatures and constant amplitude vibration in a controlled environment which may be a vacuum or gas atmosphere.

In a prior art reverse-bending fatigue testing device of our design which is described in NRL Monthly Progress Report of December 1957, pages 36 and 37, the metal specimen is mounted for vibratory movement at a constant amplitude within an elongated vacuum-tight chamber which is externally heated by an enclosing furnace. The vibratory motion is imparted to the metal specimen through the gas-tight seal by means of magnetic excitation. An extension rod carrying a permanent magnet at its upper end is attached at its lower end to the metal specimen and extends upwardly through the elongated vacuum-tight chamber into the upper, cooled portion of the chamber which is of larger diameter and separated by a heat radiation shield. The extension rod extends into the upper portion of the chamber to a distance such that the permanent magnet at its extremity is in close proximity to a glass plate which is in a gas-tight relationship with the chamber. A pair of permanent magnets are mounted above, outside and in close proximity to the glass plate and arranged to be oscillated at a predetermined frequency by means of a mechanical drive which includes a flywheel having an eccentrically mounted crank which is linked to drive the permanent magnets in tandem. The amplitude of vibration is set by adjustment of the eccentricity of the crank on the flywheel and tuning of the magnetic driver to the resonant frequency of the metal specimen is accomplished by means of a variable-speed torque converter. A probe wire is arranged to extend into the upper portion of the chamber to be manually moved into contact with the drive rod for determining the end of test. This mechanical system of drive, while simple and easy to construct, has the disadvantage that it must be stopped for adjustment of the amplitude and of the center of vibration.

It is an object of the present invention to provide a fatigue testing device of the kind above-described having an improved magnetic drive for imparting vibratory motion to the specimen through a gas-tight seal. It is a further object to provide a fatigue testing device of this kind which has an automatic control for the vibration amplitude of the specimen and drift of the center of vibration. It is also an object to provide a fatigue testing device of this kind which automatically determines the end of test and stops operation of the device.

The arrangement of parts in the fatigue testing device of our present invention is in general similar to that of our prior fatigue testing device described above. In a number of instances the parts, also, are the same or generally so, as in the case of the gas-tight specimen chamber and the heating and cooling means therefor, the mounting for holding the specimen, the means for attaching the extension rod to the specimen, the transparent glass plate at the upper end of the gas-tight chamber and the permanent magnet on the upper end of the drive rod.

In the fatigue testing device of our present invention, the vibratory motion is transmitted to the extension rod and specimen in the gas-tight chamber by means of a pair of electromagnets, 180° out of phase, which are located above and outside the gas-tight chamber and so arranged that the permanent magnet on the upper extremity of the drive rod is alternately repelled by them in accordance with a predetermined frequency amplitude. A signal generator tuned to the resonant frequency of the specimen feeds a signal to a pair of amplifiers, each of which is connected to power a separate one of the electromagnets. The upper cooled portion of the gas-tight chamber contains two sets of electrical contacts arranged to be struck by a metal sleeve on the extension rod at the end of each oscillation of the specimen. A servo-mechanism receives a signal when each of the sets of probes is struck by the metal sleeve on the extension rod and operates to hold the amplitude constant. When a crack develops in the specimen with resultant loss in amplitude, the servo-mechanism increases the power in an effort to maintain the amplitude constant until a pre-limit switch is closed causing the test to be terminated.

The construction and arrangement of parts of the fatigue testing device of our present invention will be better understood by reference to the accompanying drawings in which like parts bear like numerals and in which:

FIG. 1 is a view partly in section of a testing device in accordance with our invention, FIG. 2 is a schematic showing of the electrical system for driving the specimen at a predetermined constant amplitude, determining the end of test and shutting down operation of the fatigue testing device, and FIGURE 3 is an enlarged detail showing of a servo-circuit contact.

Referring to FIGURE 1, a gas-tight elongated chamber 1 contains the specimen to be tested and is made of a heat-resistant metal such as Inconel metal (nickel base alloy). The chamber 1 is mounted on a metal channel 2 in a gas-tight relationship by means of the circumferential flange 3 and the inset O-ring 4 of rubber. The upper end of the chamber 1 is provided with a gas-tight seal by means of the circumferential metal flange 5 having an inset O-ring 6 of rubber upon which rests a plate 7 of Pyrex glass in gas-sealing relationship. A tube 8 opens into a small tubular chamber 9 which is provided with openings 10 for fluid communication with the elongated chamber 1 for establishing a vacuum in the latter or for admitting air or other gas thereinto. The tube 8 is provided with a valved branch 11 for vacuum establishment and a valved branch 12 for admission of air or other gas.

A furnace 13 is provided for heating of the elongated gas-tight chamber 1 to create a hot zone containing the specimen. The furnace is suitably electrically heated and of a conventional, hinged, sectional construction adapted to be swung open and closed for admission and enclosure of the elongated chamber 1. The furnace is independently supported in position in any conventional or suitable way. Cooling coils 14 are provided about the elongated chamber 1 to protect the magnet and electrical parts against high temperature heat.

The metal specimen 15 is in sheet form with a necked or minimum section and is of a thickness designed to give the resonant frequency desired in the test. A pair of holes are drilled in one end of the specimen for the purpose of being pinned between holding plates 16 which are threaded as shown to the lower end of the extension rod 17. The specimen is held in position in the grip assembly 18 which is made of Inconel metal and of conventional type construction. The assembly has a flared bottom portion which rests upon the tubular chamber 9 and is seated centrally of the gas-tight chamber 1 by means of a depending circular flange 19 seated in the upper portion of the tubular chamber 9. The two sections of the cone grip are recessed to accommodate the specimen metal sheet, each section being recessed to a depth equal to half the thickness of the specimen sheet. The specimen is mounted in the cone grip by insertion in the recess of the one split section, the other section closed thereon and the rings forced tightly down over the closed sections. The rings may be easily removed for disassembly. The upper end of the specimen is then attached to the lower end of the extension rod 17. A thermocouple is inserted in the chamber 1 with the bead in contact with the specimen at a point just below the minimum section.

The upper section 20 of the elongated gas-tight chamber 1 is of slightly larger diameter and protected against heat by means of a radiant heat shield 21 which rests upon the adjacent shelf. The shield 21 is slotted centrally to allow full amplitude of movement of the drive rod 17 which passes therethrough. A permanent or horseshoe magnet 22 is attached to the upper end of the drive rod which terminates in close proximity to the glass plate 7. A tuning weight 23 is attached to the drive rod directly beneath the magnet 22. An insulated metal sleeve 24 consisting of an assembly of an inner Teflon ring having a metal ring thereabout is attached to the drive rod a short distance below the tuning weight.

Arranged in opposed, aligned openings in the side walls of the upper section 21 of the gas-sealed chamber 1 is a pair of servo-circuit probes 25—25 having a pair of beaded-tip fine spring wire (5 mil diameter) contacts 26—26 positioned to be struck by the metal sleeve 24 on the extension rod 17, once every half cycle, to complete the circuit to a servo-mechanism hereinafter described. The construction and arrangement of parts of the servo-circuit probes 25—25 is shown in enlarged detail in FIGURE 3.

Referring to FIGURE 3, a flanged metal sleeve 27 is seated in the mouth of the aperture in the side wall of the upper section 20 of the gas-tight chamber 1. Seated within the metal sleeve 27 is a flanged sleeve 28 of Teflon (sintered polytetrafluoroethylene). The Teflon sleeve forms a gas-tight seal with the metal sleeve 27 and a tapped square metal block 29. An adjusting screw 30 is threaded through the square metal block 29 and into a tapped round metal block 31. A brass bellows 32 is affixed at each end to the metal blocks 29 and 31 for movement of the block 31 on turning of the adjusting screw 30. The outer face of the metal block 31 is provided with a cap 33 of Teflon. The Teflon cap supports the contact wires 26, one of which passes through the cap and is connected with the metal block 31 to provide a common return to the servo-mechanism and the other has a lead wire which is insulated from the adjacent metal parts and passes through the Teflon sleeve 28 for connection with the servo-mechanism.

A pair of electromagnets 34—34 are mounted to rest upon the glass plate 7 and so arranged as to be centered in respect to the magnet on the drive rod 17. Each of the electromagnets is connected to a power amplifier and poled to repel the magnet 22 on the drive rod 17 when energized by the amplifiers.

Referring to FIGURE 2, the electrical system for the fatigue testing device is shown in schematic arrangement. The electromagnets 34—34 are energized by a low frequency signal generator 35 through the balancing rheostats 36—36 and power amplifiers 37—37. Each rheostat is connected with a servo-motor 38—38 which is driven from a servo-amplifier 39—39. Each servo-amplifier includes comparator inputs 40 and 41. Input 40 is supplied from a D.C. source 42 fed across a voltage divider 43—44. Input 41 is supplied by a pulsed D.C. signal from the source 42 through the contacts 26—26. The input 41 has shunted thereacross an integrating network comprising a parallel resistor 45 and capacitor 46.

In operation of the reverse-bending fatigue device of our invention, the specimen with extension rod 17 attached is mounted in the grip assembly 18 which centers the specimen in the chamber 1. A tuning weight 23 of proper value is attached to the extension rod to obtain the desired resonant frequency in the specimen. The distance of the contacts 26—26 from the metal sleeve 24 on the extension rod is adjusted to achieve the desired amplitude of vibration. The chamber 1 is then pumped down to vacuum, for example, to $1 \times 10^{-5}$ mm. of mercury.

The servo-mechanism is put into operation by adjustment of the input voltage at 40 to the selected operating value and the distance across the chamber 1 between the sets of contacts 26 is adjusted by movement of the screw adjusters 30 to give the desired amplitude of vibration to the specimen. The signal generator 35 is then tuned to the resonant frequency of the specimen. Thereafter the servo-mechanism takes over and maintains the amplitude of vibration of the specimen constant through the power delivered from the amplifier to the electromagnets. When a crack develops in the specimen, the resonant frequency of the specimen is decreased. Since the frequency of the signal generator is now no longer in resonance with the specimen, more power is required to be delivered to the electromagnets to hold the amplitude of vibration of the specimen constant. The servo-motors drive up-scale to deliver the increasing power requirements. At a pre-set power level, a limit switch is actuated to terminate power delivery and, by consequence, end the test.

Since various changes and modifications may be made in the practice of the invention herein described without departing from the spirit or scope thereof, it is intended that the foregoing description shall be taken primarily by way of illustration and not in limitation except as may be required by the appended claim.

What is claimed is:

In combination in a reverse-bending fatigue testing device, an elongated gas-tight chamber having a light and magnetically transparent end wall, means in said chamber for holding a sheet specimen and a drive rod attached at one end thereto for vibration in said chamber at constant amplitude, means for automatically correcting deviation in amplitude of vibration of said sheet specimen from a predetermined constant amplitude of vibration, said automatic amplitude correcting means comprising a permanent magnet capping the other end of the drive rod and located in proximity to the inner face of said transparent end wall, a pair of probes each having a pair of spring electrical contact elements, said probes extending into the chamber in opposed relation to each other and arranged a distance apart corresponding to a predetermined amplitude of vibration for the sheet specimen, electrical contact means on said drive rod positioned to contact said probes on maximum deflection of said sheet specimen in said chamber, a first and a second electromagnet positioned outside of and in proximity to said transparent end wall and centrally of said permanent magnet, a first means including a variable power supply electrically connecting said first probe with said first electromagnet for varying the power delivered to said first electromagnet in inverse proportion to the length of time of contact of said drive rod contact means with said first probe, and like means connecting said second probe with said second electromagnet for similarly varying the power to said second electromagnet whereby the amplitude of vibration and center of vibration of said sheet specimen are maintained constant.

References Cited in the file of this patent

UNITED STATES PATENTS

| | | |
|---|---|---|
| 1,635,787 | Hort | July 12, 1927 |
| 2,361,396 | Gross | Oct 31, 1944 |
| 2,625,659 | Mendelson | Jan. 13, 1953 |

FOREIGN PATENTS

| | | |
|---|---|---|
| 445,887 | Great Britain | Apr. 20, 1936 |